United States Patent

Sharp

[15] 3,707,310
[45] Dec. 26, 1972

[54] ANTI-LOCK BRAKE SYSTEM WITH VARIABLE RATE BRAKE PULSING

[72] Inventor: Denis Sharp, East Grinstead, England

[73] Assignee: U.S. Philips Corporation

[22] Filed: Aug. 21, 1970

[21] Appl. No.: 65,800

[30] Foreign Application Priority Data

Aug. 22, 1969 Great Britain.....................42,083/69

[52] U.S. Cl. .........................303/21 CG, 188/181 A
[51] Int. Cl. .........................................B60t 8/12
[58] Field of Search ...188/181; 303/20, 21; 307/231; 317/5; 324/160–162; 340/262–263

[56] References Cited

UNITED STATES PATENTS 3,499,689 3/1970 Carp et al............................303/21 P

FOREIGN PATENTS OR APPLICATIONS 1,901,476 7/1970 Germany...........................303/21 BE
1,914,114 3/1969 Germany...........................303/21 BE
1,914,765 3/1969 Germany...........................303/21 BE

*Primary Examiner*—Milton Buchler
*Assistant Examiner*—Stephen G. Kunin
*Attorney*—Frank R. Trifari

[57] ABSTRACT

A control circuit for a vehicle anti-lock brake system that includes a wheel sensor that produces electric signals proportional to the wheel speed, a control circuit responsive thereto to produce an electrical output when the wheel deceleration exceeds a given value, and a control valve responsive to said electrical output to release the braking pressure. The control circuit includes a pulse generator that produces a series of pulses during an anti-lock period. If the wheel continues to decelerate despite the release of the braking pressure, then the control circuit continues to supply output pulses at a rate which is a function of the wheel deceleration until the wheel deceleration no longer exceeds said given value.

12 Claims, 22 Drawing Figures

3,707,310

INVENTOR.
DENIS SHARP
BY
AGENT

INVENTOR.
DENIS SHARP

INVENTOR.
DENIS SHARP

ANTI-LOCK BRAKE SYSTEM WITH VARIABLE RATE BRAKE PULSING

This invention relates to anti-lock brake systems for wheeled vehicles, that is, brake systems including means for improving braking performance of a vehicle by relieving braking pressure applied to a road wheel of the vehicle if the wheel tends to lock on a slippery surface following brake application and then increasing the braking pressure again without the need for any change in the actual braking action (by a person using the brake) causing the brake application. Such systems can be successful in reducing the risk of skidding due to wheel lock and in maintaining directional control during braking, and can also reduce braking distances.

This invention relates more particularly to anti-lock vehicle brake systems of the character comprising, for use in conjunction with a vehicle wheel and associated wheel brake, a wheel movement sensor for producing electrical signals related (e.g., proportional) to rotational movement of the wheel, control circuit means which is responsive to said electrical signals to produce an electrical output when wheel deceleration, as signified by said electrical signals, exceeds a predetermined value, and control valve means which is arranged for actuation in response to said electrical output to relieve the braking pressure applied from a fluid pressure source of the system to the wheel brake.

In co-pending U.S. Pat. application Ser. No. 884,551, filed Dec. 12, 1969, there are disclosed various forms of control circuit means for an anti-lock vehicle brake system of the above character which are arranged to effect release of the control valve means (i.e., solenoid de-energization) to terminate a period of anti-lock action in dependence on a particular criterion related to subsequent wheel rotational movement following the relief of braking pressure by actuation of the control valve means.

One such criterion is, for example, when the wheel starts to accelerate. Another is when the wheel attains the speed it would have been doing if it had continued to decelerate at said predetermined value from the speed it was doing when the control circuit means was rendered responsive. The purpose of making the release of the control valve means dependent on such criteria was to achieve an anti-lock action without over-modulating the braking pressure, particularly on road surfaces having good adhesion. By "over-modulation" is meant relieving the braking pressure to a greater extent than is necessary to allow the wheel to recover from its tendency to decelerate to a locked condition.

Experiment has shown that dependence on a criterion related to wheel rotational movement for releasing the control valve means to terminate a period of anti-lock action may not always be successful in preventing over-modulation of the braking pressure, especially for a road surface having very poor adhesion, because there is apparently a phase lag between brake torque and the braking pressure generating this torque. Thus, in the case where the control valve means is released by the control circuit means being responsive to the wheel starting to accelerate, it was found that the wheel did not actually start to accelerate until the braking pressure was well below the pressure actually required to allow it to accelerate. The drop-out time of a solenoid by which the control valve means is actuated also allows the braking pressure to keep on falling even when the solenoid is de-energized to effect release of the control valve means.

The present invention provides in or for use in an antilock vehicle brake system of the character referred to a control circuit means which can provide an anti-lock action in which there is less tendency for the braking pressure to be over-modulated as compared with the prior control circuit means referred to above.

A control circuit means according to the present invention comprises pulse generating means capable of producing in each period of anti-lock action a number of electrical output pulses in succession, for energization of said control valve means, when wheel deceleration exceeds said predetermined value, said pulse generating means being adapted to produce said pulses at a rate which is a function of the extent of continued deceleration of the wheel in excess of said predetermined value.

With such a control circuit means, if the wheel continues to decelerate despite the reduction in braking pressure caused by actuation of the control valve means in response to the first output pulse, then additional output pulses are supplied by the control circuit means, as necessary, until wheel deceleration is no longer in excess of said predetermined value.

Preferably, the pulse generating means of the control circuit means is so arranged that each output pulse is of sufficient duration to cause actuation of said control valve means and is further arranged such that for wheel deceleration at said predetermined value or slightly greater the repetition rate of the output pulses is sufficiently slow for the control valve means to be actuated and released in response to each output pulse, whereas for greater values of wheel deceleration the repetition rate is sufficiently fast to maintain the control valve means actuated during the period between one output pulse and the next.

The control circuit means may include a first "back-up" means which becomes effective when the wheel is being braked on a very slippery road surface, for which the usual output pulses produced by the control circuit means may be insufficient to free the wheel, to effect prolonged actuation of said control valve means. Such first "back-up" means can comprise a deceleration detector for producing an output when wheel deceleration is in excess of said predetermined value and a timing element responsive to said output to commence a timing sequence at the end of which it causes the control valve means to be held actuated independently of the output pulses produced by the pulse generating means until the wheel reaches the speed it would have been doing if it had continued to decelerate at the reference value.

As an alternative and/or addition, the control circuit means may include a second "back-up" means arranged to measure how far the wheel deceleration is in excess of the reference deceleration and to vary the length of the output pulses produced by the pulse generating means as a function of the difference. Each of these "back-up" means may be adapted to be initially responsive when the reference deceleration is exceeded, and to be thereafter responsive to terminate its action in accordance with a lesser reference deceleration value to which it is subjected when the control valve means is actuated.

In further considering the nature of the invention reference will now be made by way of example to the accompanying drawings, in which:

FIG. 1 is a block diagram of an anti-lock vehicle brake system of the character referred to;

FIG. 2 is a block diagram of the control circuit means of an anti-lock vehicle brake system of the character referred to;

Figure 1:
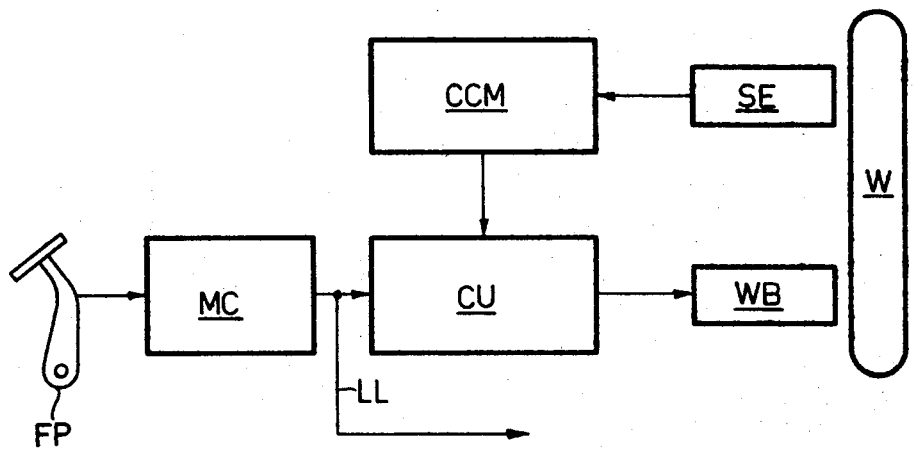

Referring to the drawings, FIG. 1 shows diagrammatically a general layout for an anti-lock vehicle brake system in which the present invention can be embodied. This layout shows a brake foot pedal FP for actuating the piston of a master cylinder MC which constitutes a fluid pressure source for the system. The master cylinder is arranged to actuate (directly or via a servo) a wheel brake WB for a vehicle wheel W via an anti-lock control unit CU. A wheel sensor SE applies electrical pulses related (e.g., proportional) to wheel rotational movement to a control circuit means CCM. The anti-lock control unit CU would include control valve means which is arranged for actuation in response to an electrical output from the control circuit means CCM to relieve braking pressure applied to the wheel brake WB. This system, if of the character previously referred to, and in the present instance in which the control circuit means is in accordance with FIGS. 2 and 3, as will be described, produces an electrical output from the control circuit means CCM when the deceleration of the wheel is in excess of a predetermined value.

As indicated by the lead LL, separate systems as shown in FIG. 1 (with a common fluid pressure source) may be provided in respect of each road wheel of a vehicle, but it would also be possible to provide a single system for two (rear) wheels driven by a vehicle drive shaft with a sensor associated with the shaft for producing the electrical signals related to wheel rotational movement. As an alternative, a single anti-lock control unit including control valve means may be provided in common for all the roads wheels of a vehicle. In this case, each road wheel would have its own wheel sensor and associated control circuit means, and any of the latter would provide an electrical output to actuate the control valve means when the appertaining wheel tends towards a locked condition. A particular form of anti-lock vehicle brake system of the character referred to, to which the present invention can be applied is disclosed in co-pending U.S. Pat. application Ser. No. 215,622, filed Jan. 5, 1972.

Figure 2:
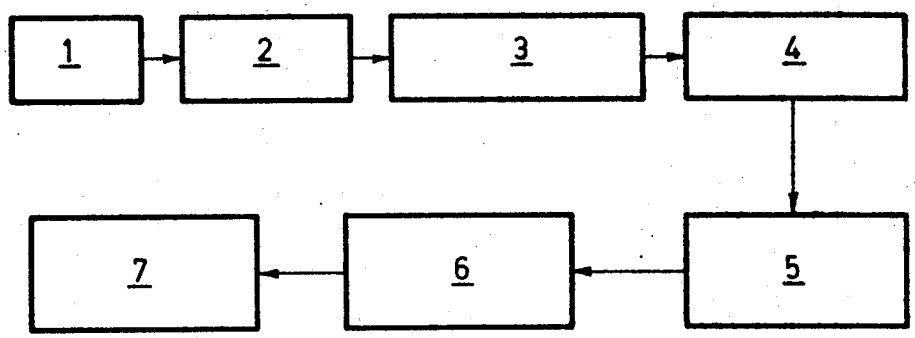

Turning now to FIG. 2, the control circuit means represented by the block diagram there shown is responsive to pulses related to rotational movement of a vehicle wheel. These pulses may be produced by an electromagnetic pick-up 1 which is associated with a ferromagnetic toothed ring rotatable with the wheel to sense change of flux as each tooth of the ring passes it and is succeeded by a gap as the wheel revolves. The pulse output from the pick-up 1 is amplified and limited by an amplifier 2, and the resulting square wave output is applied to a frequency-to-DC converter 3 which is responsive to the square wave output to produce an output voltage of of magnitude related to the frequency of the pulses supplied by the pick-up 1. This output voltage is applied to a signal processing circuit 4 which is responsive to produce an electrical output when wheel deceleration exceeds a predetermined value as signified by the output voltage from the convertor 3. The output from the circuit 4 is amplified by a power amplifier 5, and the output from the power amplifier 5 is utilized to operate a solenoid 6 which is adapted to actuate control valve means 7 of an anti-lock vehicle brake system.

Figure 3:
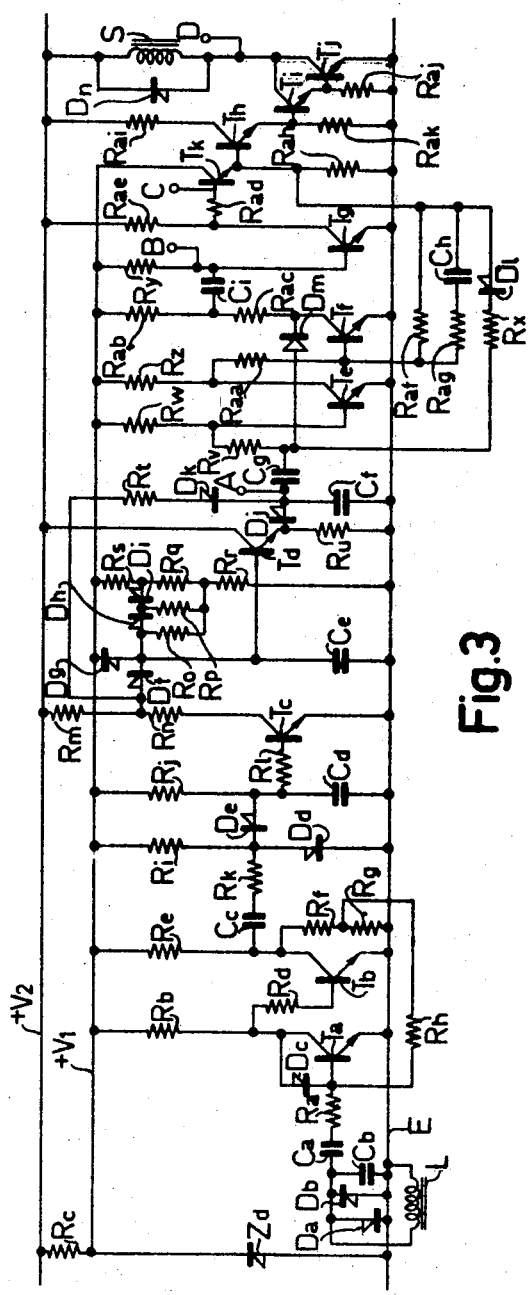
FIG. 3 is a circuit diagram of the control circuit means of FIG. 2 and is arranged in accordance with the invention.

The circuit diagram of the control circuit means is shown in FIG. 3 and comprises a transistor $Ta$ having its base connected via a resistor $Ra$ and a capacitor $Ca$ to one end of an output coil L of a pick-up device (not otherwise shown) which is arranged to produce an alternating input signal for application to the base of transistor $Ta$. The other end of the coil L is connected to a ground E. The collector of the transistor $Ta$ is connected to a stabilized positive voltage line $+V1$ via a collector resistor $Rb$, and its emitter is connected directly to the ground E. A capacitor $Cb$ serves to remove unwanted interference in the alternating input signal received from the coil L, and diodes $Da$ and $Db$ limit the amplitude swing of the alternating input signal. The stabilized voltage $+V1$ is provided by a Zener diode $Zd$ which is connected in series with a resistor $Rc$ between the ground E and a supply voltage line $+V2$. There is connected between the collector and base of transistor $Ta$ a diode $Dc$ which is poled so as to conduct current from the collector to the base. A resistor (not shown) may also be included in series with the diode $Dc$. When the circuit is energized by the application of a suitable supply voltage across the supply voltage line $+V2$ and the earth line E, the transistor $Ta$ is initially biased at the threshold of conduction by a bias voltage which is present at its base. This bias voltage is the voltage drop across the diode $Dc$ due to current flow therethrough from collector to base. Upon the application of an alternating input signal from the coil L to the base of transistor $Ta$, this transistor is rendered conductive in response to each cycle of the input to effect amplification and limiting at the pulse train frequency, and the resulting output at the collector of transistor $Ta$ is a square wave voltage. More specifically, with the transistor $Ta$ at the threshold of conduction, this transistor is driven into saturation each time the rate of change of signal current through capacitor $Ca$ drives sufficient current into the transistor base. Conversely, the transistor $Ta$, when saturated, is turned off each time the rate of change of signal current through capacitor $Ca$ drives insufficient current into the transistor base to maintain the saturation condition. This circuit operation is made possible, irrespective of large variations in the amplitude of the alternating input signal, because the bias voltage at the base of transistor $Ta$ remains substantially unchanged due to the action of the diode $Dc$ which provides a voltage drop between the collector and the base of the transistor $Ta$. As aforesaid, this voltage drop, which may be of the same value as the base-emitter voltage of the transistor $Ta$, provides the bias voltage at the transistor base. Each negative half-cycle of the alternating input signal draws increased current, in relation to its amplitude, through the diode Dc and, but for the latter, this increased current would produce at the base of transistor Ta a change in the bias voltage in a sense taking the transistor hard into cut-off to an extent determined by the magnitude of the change. The diode Dc prevents from happening by functioning as a constant voltage device to maintain the bias voltage substantially unchanged at the base of the transistor Ta.

The square wave output produced at the collector of transistor Ta is fed via a resistor Rd into the base of a further transistor Tb which has its emitter connected to the ground line E and its collector connected via a resistor Re to the stabilized voltage line +V1. Two resistors Rf and Rg areconnected in series between the collector of transistor Tb and the ground line E, and a connection including a resistor Rh is taken from the junction of the resistors Rf and Rg to the base of the transistor Ta. With transistor Ta cut-off, the transistor Tb is saturated so that the junction of the resistors Rf and Rg is effectively at the potential of the ground line E. Thus the base of the transistor Ta can be considered as being connected to the ground line E through the resistor Rh. The ratio of the values of the resistors Ra and Rh determines the minimum magnitude of an alternating input signal which must be present before the transistor Ta is rendered conductive. This ratio may be, for example, 1:10. When the transistor Ta is saturated, the transistor Tb is cut-off, so that the junction of the resistors Rf and Rg is at a potential above that of the ground line E, being a proportion of the collector potential of transistor Tb in dependence on the relative values of the resistors Rf and Rg. Thus the base of the transistor Ta in now effectively connected to this potential which is arranged to be as much greater than the bias voltage as the bias voltage is greater than the potential of the ground line E. Consequently, due to the ratio of the values of the resistors Ra and Rh, an input signal of said minimum magnitude but of opposite sense to that previously described must be present before the transistor Ta is cut off. A square wave output is produced at the collector of transistor Tb, but only when the alternating input signal is greater than a minimum value. This prevents the circuit from producing a spurious square wave output in response to low amplitude noise signals received with an applied input. The circuit element formed by transistors Ta and Tb and their associated components is also described in copending U.S. Pat. application Ser. No. 58,348, filed July 27, 1970 and forms the amplifier 2 of FIG. 2.

The square wave output at the collector of transistor Tb is applied to an input circuit element for a frequency-to-DC converter circuit, which forms the circuit 3 in FIG. 2. This input circuit has the function of producing an output of constant pulse width in response to the square wave output at the collector of transistor Tb. It comprises a first time constant element formed by a capacitor Cc and a resistor Ri and a second time constant element formed by a capacitor Cd and a resistor Rj. A resistor Rk is connected in series between the capacitor Cc and the resistor Ri but the value of this resistor Rk is very small compared with the value of the resistor Ri so that its effect on the first time constant element is negligible. The junction of the two resistors Ri and Rk is connected to the ground line E via a diode Dd, and also to the junction of the resistor Rj and capacitor Cd via a diode De. This latter junction is also connected via a resistor Rl to the base of a transistor Tc, which has its emitter connected directly to the ground line E and its collector connected via resistors Rm and Rn to supply voltage line +V2.

When the transistor Tb is saturated, the rate of change of current in a negative sense at the collector of transistor Tb (i.e., the leading edge of the resulting square wave output pulse) is reflected through capacitor Cc, which is therefore effectively discharged, so that the potential at the junction of resistors Ri and Rk undergoes a rapid change in a negative sense. This causes diode De to become forward biased so that the potential at the base of transistor Tc also undergoes a rapid change in negative sense due to the capacitor Cd discharging through diode De. As a result transistor Tc is cut off. Thereafter, the capacitor Cc commences to charge-up through resistor Ri so that the potential at the junction of resistors Ri and Rk is restored as a sawtooth function towards its original value. Also, the capacitor Cd commences to charge-up through resistor Rj so that the potential at the base of transistor Tc is also restored as a sawtooth towards its original value. When this latter potential reaches its original value the transistor Tc is rendered conductive again.

If the time constant value of capacitor Cc and resistor Ri is less than the cyclic time of the alternating input signal, then the potential at the junction of resistors Ri and Rk will restore to its original value as a sawtooth and remain at that value until the next leading edge of the square wave output pulse produced at the collector of transistor Tb. However, if this time constant value is less than the cyclic time, then on the occurrence of the trailing edge of the subsisting square wave output pulse, the rate of change of current in a positive sense at the collector of transistor Tb is reflected through capacitor Cc which is therefore effectively charged-up via diode Dd, so that the potential at the junction of resistors Ri and Rk is restored by this trailing edge to its original value. However, the restoration as a sawtooth of the potential at the base of transistor Tc remains unaffected by the sudden change in potential at the junction of resistors Ri and R k because diode De remains back biased. Therefore, the time period for which Tc remains cut-off, and thus the duration of each output pulse at its collector, remains constant. Of course, the output pulse frequency varies with a variation in the frequency of the alternating input signal, but the duration of the output pulses is unaffected by variations in the mark-space ratio of the alternating input signal.

It will be appreciated that if the cyclic time of the alternating input signal becomes equal to or shorter than the time constant value of capacitor Cd and resistor Rj, then the output pulses will, in effect, overlap so that a continuous output voltage is produced. This input circuit element is also described in co-pending U.S. Pat. application Ser. No. 58,347, filed July 27, 1970.

The output voltage at the junction of resistors Rm and Rn is applied to a frequency-to-DC converter circuit. This comprises diodes Df, Dg, Dh, Di, Dk, resistors Ro, Rp, Rq, Rr, Rs, Rt, Ru, capacitors Ce and Cf, and transistor Td, and functions to produce at the emitter of transistor Td an output voltage which is related to the frequency of the alternating input signal from the pick-up coil L. More specifically, the capacitor $Ce$ is a timing capacitance which is arranged to be charged by the positive half-cycle of each pulse applied to it via diode $Df$ from the junction of resistors $Rm$ and $Rn$. The diode $Dg$ functions to limit the voltage across the capacitor $Ce$ to the voltage of the stabilized voltage line $+V1$. During the periods between successive pulses, the capacitor $Ce$ is allowed to discharge. Initially, there are two discharge paths for this purpose, one via resistor $Ro$ and the other via diode $Dh$ and resistor $Rp$. However, the junction of the resistor $Rp$ and diode $Dh$ is connected via diode $Di$ to the junction of the two resistors $Rs$ and $Rq$, which together with resistor $Rr$ form a potential divider between the stabilized voltage line $+V1$ and the ground line E. Thus, when the voltage across the capacitor $Ce$ has decayed below the value of the voltage present at the junction of resistors $Rs$ and $Rq$, the diode $Dh$ becomes reverse biased so that a further decay of the charge on the capacitor $Ce$ is now via resistor $Ro$ only. In other words, the decay of the charge on the capacitor $Ce$ is at two different exponential rates which together result in a decay curve which approximates a rectangular hyperbola. The voltage across capacitor $Ce$ is applied to the base of transistor $Td$ to produce the output voltage related to the frequency of the alternating input signal.

The transistor $Td$ and diode $Dj$ may be replaced by an n-p-n transistor having its emitter connected to capacitor $Cg$ and its collector connected through a load resistor to the ground line E. As another modification, resistor $Rt$ can be connected to the line $+V1$ or $+V2$ instead of to the junction of resistors $Rm$ and $Rn$. In this case the diode $Dk$ would be omitted.

The output voltage at the emitter of transistor $Td$ may be termed a speed signal as it is directly related to wheel speed. A typical speed signal is shown in waveform diagram 6a for a surface with poor adhesion (in full line) and for a surface with good adhesion (in broken line). The part of the circuit of FIG. 3 next to be described forms the signal processing circuit 4 in FIG. 2 and functions in accordance with the invention to effect multi-pulsing of a solenoid which causes actuation of a control valve means to relieve braking pressure. Waveform diagram 6b in FIG. 6 shows a typical braking pressure curve resulting from the application of the invention. Waveform diagram 6c shows the voltage pulses which are produced for solenoid energization.

In the signal processing circuit in FIG. 3, the output (speed signal) voltage at the emitter of transistor $Td$ is applied to the base of a normally conductive transistor $Te$ via a capacitor $Cg$ and a resistor $Rv$. The value of this capacitor $Cg$ and the value of a resistor $Rw$ determine a selected wheel deceleration at which transistor $Te$ is turned "off" in response to the value of speed signal voltage then obtaining. Transistors $Tf$ and $Tg$ form a monostable circuit with transistor $Tf$ normally cut off and transistor $Tg$ normally in saturation. Transistor $Tk$ is an emitter follower to give a low output impedance from transistor $Tg$. The monostable circuit is triggered on when transistor $Te$ is turned off; i.e., it has detected that the wheel has decreased its speed sufficiently to overcome the back-lash by resistor $Rv$. This back-lash feature is described in copending U.S. Pat. application Ser. No. 65,163, filed Aug. 19, 1970.

With the monostable circuit triggered, transistor $Tg$ is cut off and the emitter voltage of transistor $Tk$ is almost equal to the stabilized voltage $+V1$. This forward biases a diode $Dl$ which is connected to the emitter of transistor $Tk$ and in series with a resistor $Rx$ is connected to the junction of capacitor $Cg$ and resistor $Rv$. The current flowing through diode $Dl$ and resistor $Rx$ resets the voltage across the capacitor $Cg$ to the value it would be if the wheel was rotating at constant speed. A diode $Dm$ may be connected as shown to prevent the voltage across capacitor $Cg$ from being reset to too high a value. Since the voltage across capacitor $Cg$ is now reset, the wheel must decrease its speed by a further amount at a rate in excess of the predetermined value of deceleration in order to trigger a further pulse from the monostable circuit. This is repeated until wheel deceleration no longer exceeds said predetermined value.

Figure 6A:
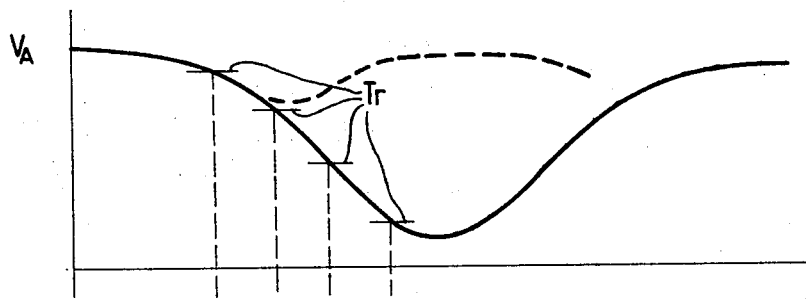
FIGS. 6a–6c, 7a–7f and 8a–8h show explanatory waveform diagrams.
Figure 6B:
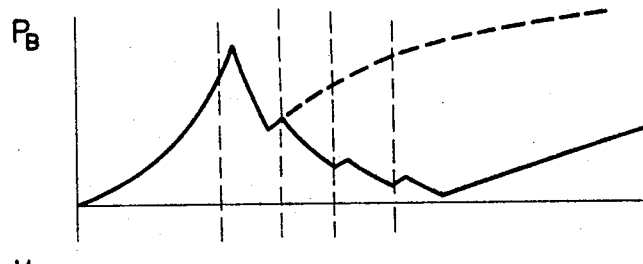
Figure 6C:
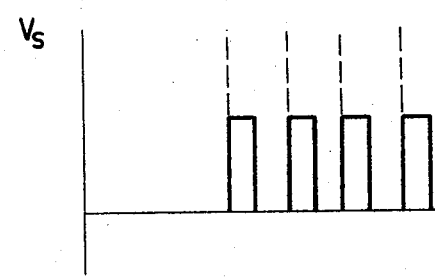
Figure 7A:
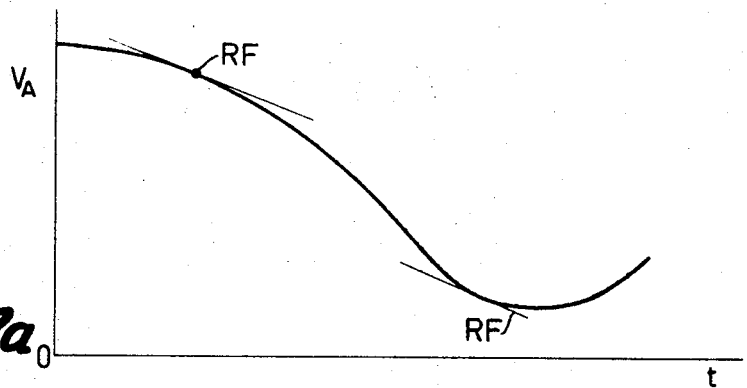
Figure 7B:
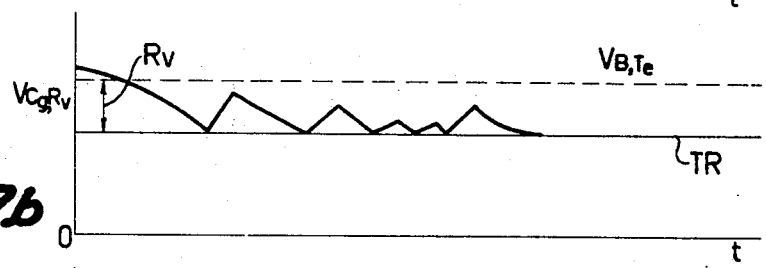
Figure 7C:
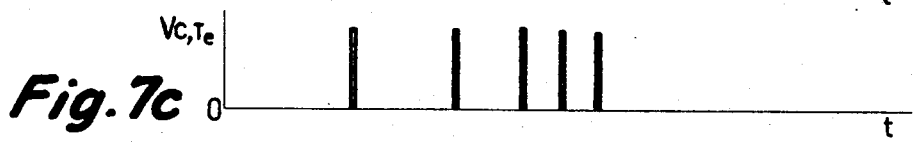
Figure 7D:
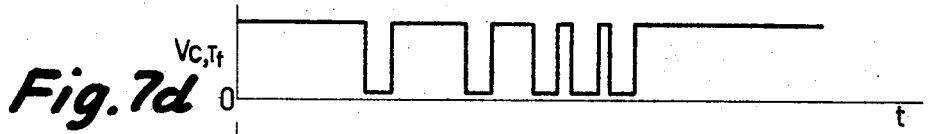
Figure 7E:
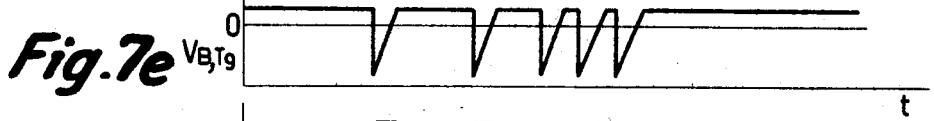
Figure 7F:
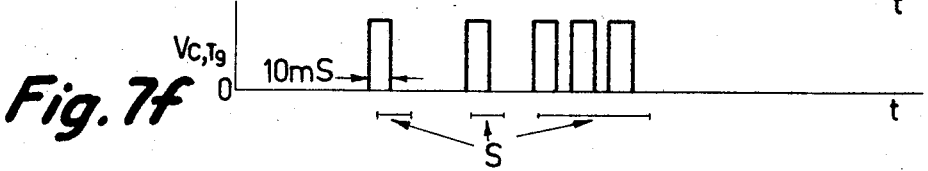
Figure 8A:
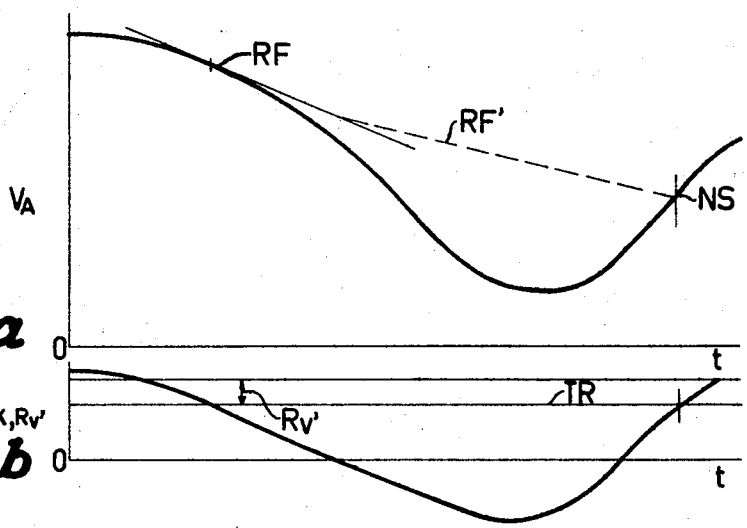
Figure 8B:
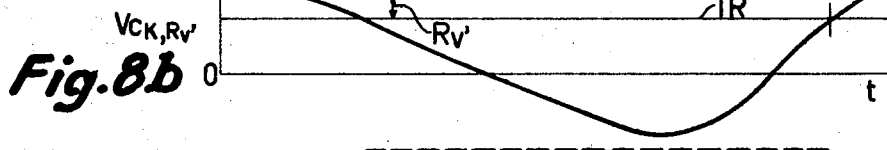
Figure 8C:
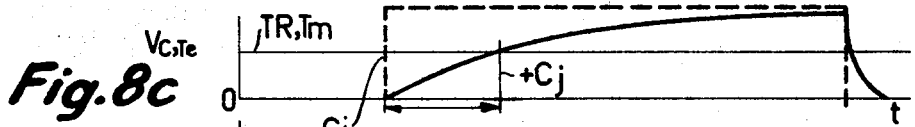
Figure 8D:
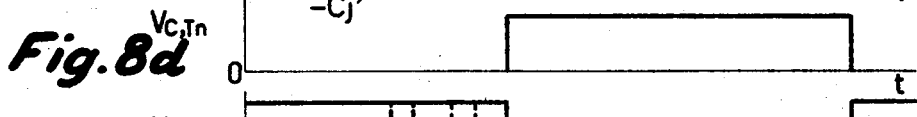
Figure 8E:
Figure 8F:
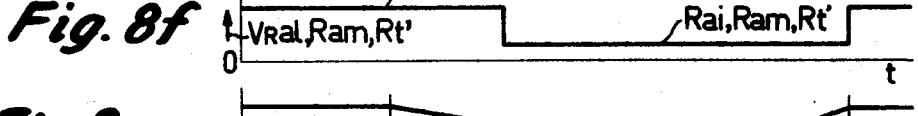
Figure 8G:
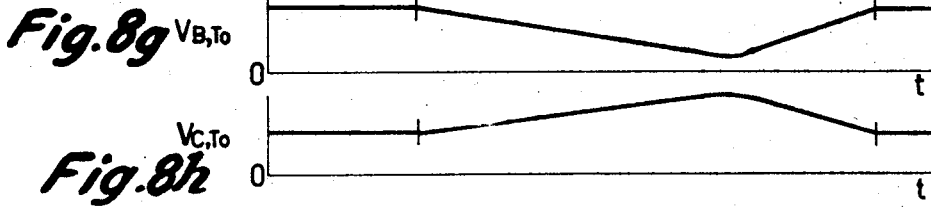
Figure 8H:
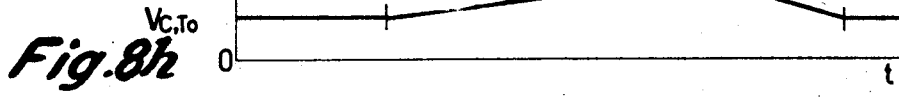

In FIG. 6a, it has been convenient to consider the instants when the voltage pulses are produced for solenoid energization as corresponding to triggering levels on the wheel speed signal. However, it will be evident from the foregoing description that such levels are not fixed but depend, inter-alia, on the rate of change of the wheel speed signal (i.e., on the rate of wheel deceleration). It follows, therefore, that the frequency of the voltage pulses also depends inter-alia on the rate of wheel deceleration and would be equi-spaced, as shown in FIG. 6c, only for a constant rate of wheel deceleration in excess of said predetermined value, as has been assumed in FIG. 6. More comprehensive waveform diagrams which are illustrative of the operation of the signal processing circuit included in FIG. 3 are shown in FIG. 7, to which reference will now be made. The waveform diagram in FIG. 7a represents a speed signal voltage at A (FIG. 3) which indicates a continually increasing rate of wheel deceleration following reference value as represented by the slope of the tangential line RF. At the start of any period of anti-lock action the first voltage pulse for solenoid energization is determined by the action of the deceleration reference ($Cg$, $Rw$) and the backlash setting ($Rv$) on the speed signal voltage at A. This action is illustrated in FIG. 7b which shows the resultant voltage at the junction of $Cg$ and $Rv$. The line $Tr$ in FIG. 7b represents the trigger level at which transistor $Te$ is rendered non-conductive and the dotted line represents the backlash level, due to resistor $Rv$, which is greater than the trigger level by the $V_{be}$ of transistor $Te$ (i.e., about 0.6 volts). When the voltage at the junction of $Cg$ and $Rv$ falls to the trigger level $TR$ transistor $Te$ is turned off and its collector voltage rises sharply as illustrated in FIG. c. This turns on transistor $Tf$ which together with transistors $Tg$ and $Tk$ form the monostable circuit. The monostable circuit produces a pulse whose width is determined by $Ci$ and $Ry$ (and also any back-up system that may be connected at terminal B of FIG. 3, as will be described presently). FIG. 7d illustrates the voltage pulse(s) at the collector of transistor $Tf$, FIG. 7e illustrates the voltage pulses(s) at the base of transistor $Tg$, and FIG. 7f illustrates the voltage pulse(s) at the collector of transistor $Tg$. Voltage pulses similar to FIG. 7f are present at the emitter of transistor $Tk$, with the result that voltage pulses similar to those shown in FIG. 7d are present at the collectors of transistors T$i$ and T$j$ to effect solenoid energization. Because of the rise in voltage at the emitter of transistor T$k$, diode D$l$ becomes conductive and this causes transistor T$e$ to become conductive again. The rise time is therefore determined by continuing deceleration of the wheel (which opposes the rise), the value of resistor R$x$ and the deceleration setting. The process is then repeated so long as wheel deceleration in excess of the reference value continues to produce further voltage pulses for solenoid energization. Each such pulse is of sufficient duration to operate the solenoid. If the wheel is decelerating at a value only slightly in excess of the reference rate, then the time between pulses will be sufficiently long for the solenoid to drop-out, (i.e., release) between successive pulses. If the wheel is decelerating rapidly at a rate in excess of the reference value, then the time between successive pulses will be insufficient for the solenoid to drop-out between pulses. This is illustrated in FIG. 7 in which, for the first two pulses, the solenoid has time to drop-out between pulses, but with the last three pulses the solenoid remains operated during the periods between them. For a pulse width of 10 milliseconds the solenoid would be operated typically for 15 milliseconds due to its release lag and its operation would be delayed slightly relative to a pulse due to its operating lag.

Figure 4:
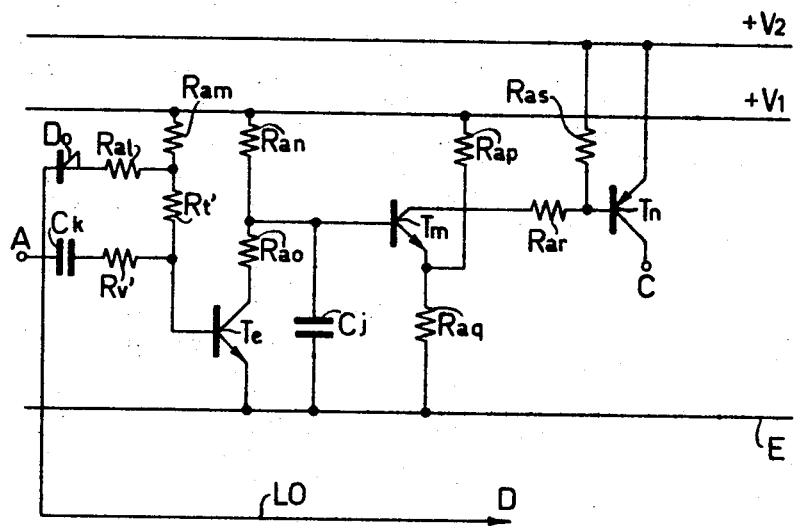
FIGS. 4 and 5 show respective "back-up" elements for the control circuit means of FIG. 3.

If the short pulses from the monostable circuit (T$f$, T$g$) are insufficient to free the wheel due to braking being effected on a very slippery surface, then a "back-up" element, when provided, would take-over. The "back-up" element shown in FIG. 4 is for connection at points A and C in FIG. 3, as indicated. This "back-up" element comprises a transistor T$l$ which is similar in function to transistor T$e$ in FIG. 3. Back-lash and deceleration resistors R$v'$ and R$t'$ are provided. These can have different values than that of resistors R$v$ and R$t$ in FIG. 3. A capacitor C$j$ is connected between the collector of transistor T$l$ and the ground line E. When transistor T$l$ is cut-off due to deceleration of the wheel exceeding the reference deceleration, the voltage across this capacitor rises exponentially towards the stabilized voltage +V1. After approximately 70 milliseconds, a transistor T$m$ is turned on and hence an output is produced to energize the solenoid since the collector of a further transistor T$n$, which is rendered conductive by transistor T$m$ becoming conductive, is connected to point C in FIG. 3. This "back-up" element will maintain solenoid energization until the wheel speed equals the reference speed once again, whereupon transistor T$l$ will turn on and quickly discharge capacitor C$j$, thus rendering transistors T$m$ and T$n$ non-conductive to terminate the output.

FIG. 8 shows waveform diagrams which are illustrative of the operation of FIG. 4. Waveform diagram FIG. 8$a$ represents the wheel speed signal at A and waveform diagram FIG. 8$b$ represents the voltage at the junction of C$k$ and R$v'$. The collector voltage of transistor T$l$ is represented by waveform diagram FIG. 8 $c$, from which can be seen the effect of capacitor C$j$ in providing a time delay before transistors T$m$ and T$n$ are turned on to effect solenoid energization independently of the circuit of FIG. 3. Waveform diagram FIG 8$d$ represents the voltage at the collector of transistor T$n$ (i.e., at point C), and waveform diagram FIG 8 $e$ represents the voltage at the collector of transistor T$j$ (FIG. 3) The voltage pulses at the collector of transistor T$j$ due to the circuit of FIG. 3 are shown in dotted lines in FIG 8 $e$. When the solenoid S (FIG. 3) is energized the voltage drop at point D is fed via lead L$o$, diode D$o$ and resistor R$al$ to the junction of resistors R$am$ and R$t'$. Thus the voltage at this junction is now determined by resistors R$am$, R$t'$ and R$al$ instead of only by resistors R$am$ and R$t'$, so that this voltage is less than what it is when the solenoid is unenergized. Consequently, the reference deceleration value is reduced correspondingly (e.g., by half). The voltage at the junction of resistors R$al$, R$am$ and R$t'$ is represented by the waveform diagram FIG. 8 $f$. The change in the value of the reference deceleration is represented by the change in the slope of the reference deceleration line RF to the new reference deceleration line RF' in FIG. 8 $a$. The back-up circuit of FIG. 4 terminates its output when the wheel being monitored has reached the speed it would have been doing if it had continued to decelerate at the new reference deceleration, that is when the wheel speed signal reaches point NS where it intersects the new reference deceleration line RF'.

Figure 5:
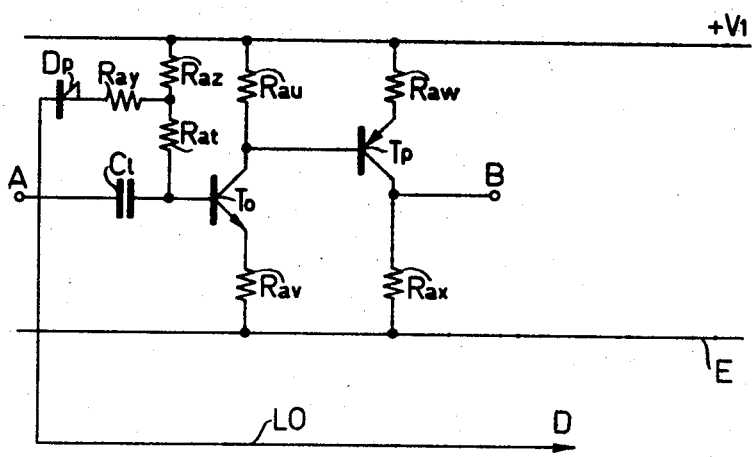

The "back-up" element shown in FIG. 5 is for connection between points A and B in FIG. 3 and resistor R$y$ is omitted. Resistor R$y$ and capacitor C$i$ normally determine the width of the pulses produced by the monostable circuit. The "back-up" element in FIG. 5 provides variable width pulses by replacing R$y$ and by providing an output to the base of transistor T$g$ (FIG. 3) related to how far the speed signal is below the reference deceleration. More specifically, components C$l$, R$at$ and R$az$ provide the reference deceleration for controlling the conductive state of transistor T$o$ in accordance with the value of the wheel speed signal. However, in this circuit a resistor R$av$ is connected in series with the emitter-collector path of transistor T$o$ so that when the reference deceleration is exceeded transistor T$o$ does not turn off completely (as do transistors T$l$ and T$e$ — FIGS. 4 and 3), but instead the current through it is reduced. Wave form diagram 8 $g$ represents the voltage at the base of transistor T$o$ (and also at its emitter — ignoring V$_{be}$) and waveform diagram 8 $h$ represents the voltage at the collector of transistor T$o$ and thus at the base of transistor T$p$. The voltage at the collector of transistor T$p$ (i.e., at point B), is inverted and thus varies in the same sense as the voltage at the base of transistor T$o$. The further the wheel deceleration is below the reference deceleration the more the current through transistor T$o$ is reduced. By means of transistor T$p$ a current proportional to the collector current of transistor T$o$ is fed to the base of transistor T$g$ (FIG. 3). Thus, when the wheel deceleration is only slightly below the reference deceleration then the monostable (T$f$, T$g$, T$k$) in FIG. 3 will produce short pulses for solenoid energization. When the wheel deceleration is well below the reference deceleration then long pulses will be produced for solenoid energization. If the wheel deceleration is far enough below the reference deceleration to turn off transistor T$o$ completely, then transistor T$p$ will turn off altogether and the output stage of FIG 3 will remain on to hold the solenoid energized until this condition no longer obtains. The reference deceleration setting for FIG 5 is altered in the same way as that described for FIG. 4 when the solenoid is energized.

Transistor $Tk$ drives a transistor $Th$ and further transistors $Ti$ and $Tj$ amplify the output from transistor $Th$. The transistors $Th$, and $Ti$ and $Tj$ form the power amplifier 5 of FIG. 2. The output from transistor $Tj$ drives a solenoid S which corresponds to the solenoid 6 in FIG. 2. A diode $Dh$ serves to clip overshoot voltage on the solenoid S when it is switched off thereby preventing too high a voltage from being applied to the collector of transistor $Tj$.

Suitable components and component values for the circuit diagram of FIG. 3 are as follows, for a road wheel diameter of 2 feet having 60 teeth/revolution on a toothed ring attached thereto. A typical output voltage from the magnetic pick-up would be 1 volt peak at 100cps (7mph) and 10 volts peak at 1,000 cps. (approx. 70 mph).

Resistors

| | | | | | |
|---|---|---|---|---|---|
| $Ra$ – 22K | ohms | $R1$ – 1K | ohms | $Rv$ – 33K | ohms |
| $Rb$ – 47K | " | $Rm$ – 1K | " | $Rw$ – 680K | " |
| $Rc$ – 150 | " | $Rn$ – 100Ω | " | $Rx$ – 56K | " |
| $Rd$ – 10K | " | $Ro$ – 15K | " | $Ry$ – 270K | " |
| $Re$ – 4.7K | " | $Rp$ – 15K | " | $Rz$ – 330K | " |
| $Rf$ – 68K | " | $Rq$ – 1K | " | $Raa$ – 100K | " |
| $Rg$ – 12K | " | $Rr$ – 1K | " | $Rab$ – 10K | " |
| $Rh$ – 220K | " | $Rs$ – 1K | " | $Rac$ – 10K | " |
| $Ri$ – 100K | " | $Rt$ – 22K | " | $Rad$ – 10K | " |
| $Rj$ – 82K | " | $Rah$ – 6.8K | " | $Rae$ – 68K | " |
| $Rk$ – 1K | " | $Ru$ – 3.3K | " | $Raf$ – 100K | " |
| $Rai$ – 220 | " | $Raj$ – 1K | " | $Rag$ – 100K | " |
| | | $Rak$ – 10K | " | | |

Capacitors
$Ca$ – 0.22/μF
$Cb$ – 0.1/μF
$Cc$ – 0.022/μF
$Cd$ – 0.47/μF $Ce$ – 0.22/μF
$Cf$ – 1.0/μF
$Cg$ – 02.2/μF
$Ch$ – 00.01/μF
$Ci$ – 0.1/μF Transistors
$Ta$ – BC108 (Mullard)
$Tb$ – "  "
$Tc$ – "  "
$Td$ – pnp (BCY71)  "
$Te$ "  "
$Tf$ "  "
$Tg$ "  "
$Th$ –  "
$Ti$ – BFY52  "
$Tj$ – BDY10  "

Diodes
$Zd$ – 8.2 zener (Mullard)

$Da$ – OA202  "
$Db$ –  "  "
$Dc$ –  "  "
$Dd$ – OA202 (Mullard)
$De$ –  "  "
$Df$ –  "  "
$Dg$ –  "  "

Voltages
$Dh$ – " (Mullard)  +V1–8.2v
                                         stabilized
$Di$ – "   "   +V2–12v.
$Dj$ – "   "
$Dk$ – "   "
$Dl$ " (Mullard)
$Dm$ "    "
$Dn$ " BYZ10

Suitable components and values for the circuits of FIGS. 4 and 5 are as follows:

Resistors

| | | | |
|---|---|---|---|
| $Rv'$ – 68K | ohms | $Rar$ – 33K | ohms |
| $Rt'$ – 1.2M | " | $Ras$ – 150K | " |
| $Ral$ – 8.2 | " | $Rat$ – 560K | " |
| $Ram$ – 8.2K | " | $Rau$ – 300K | " |
| $Ran$ – 470K | " | $Rav$ – 33K | " |
| $Rao$ – 33K | " | $Raw$ – 180K | " |
| $Rap$ – 2.7K | " | $Rax$ – 220K | " |
| $Raq$ – 2.7K | " | $Ray$ – 8.2K | " |
| | | $Raz$ – 8.2K | " |

Transistors
$Tl$ – BC108 (Mullard)
$Tm$ – BC108   "
$Tn$ – BCy71   "
$To$ – BC108   "
$Tp$ – BCY71   "

Diodes
$Do$ – OA202 (Mullard)
$Dp$ – OA202   "

Capacitors
$Cj$ – 0.15 /82 F
$Ck$ – 2.2 /μF
$C$ – 2.2 /μF

Instead of using discrete components for the circuits of FIGS. 3 to 5, these circuits may be formed as integrated circuits, for example as thin film integrated circuits mounted with transistor chips.

What we claims is:

1. Control circuit means for use in an anti-lock vehicle brake system that includes means for deriving electric signals related to the rotational movement of the wheel and means responsive to said signals for deriving a wheel speed signal whose magnitude is a function of wheel speed comprising, control valve means for altering the vehicle brake pressure, a differentiating circuit adapted to receive said wheel speed signal, pulse generating means coupled between the output of said differentiating circuit and the input to the control valve means and adapted to produce a train of electric output pulses during each period of anti-lock action thereby to energize said control valve means when the wheel deceleration exceeds a predetermined reference deceleration value, said pulse generating means being adapted to produce said pulses at a rate which varies as a function of the degree to which continued deceleration of the wheel exceeds said reference value, said pulse generating means including a monostable circuit, the component values of said differentiating circuit defining the reference deceleration value and the differentiating circuit being responsive to said wheel speed signal when the reference deceleration value is exceeded to produce an output signal which triggers said monostable circuit, the monostable circuit, when triggered, being responsive to produce an output pulse for causing energization of said control valve means and being further responsive to produce a feedback signal coupled to the differentiating circuit to reset the latter so that a further output therefrom to trigger the monostable circuit again is conditional upon a further decrease in wheel speed at a rate in excess of said predetermined reference value of deceleration.

2. Control circuit means as claimed in claim 1, wherein said pulse generating means is arranged so that each output pulse is of sufficient duration to cause actuation of said control valve means, and is further arranged such that for wheel deceleration at said predetermined value or slightly greater the repetition rate of the output pulses is sufficiently slow for the control valve means to be actuated and released in response to each output pulse, whereas for greater values of wheel deceleration the pulse repetition rate is sufficiently fast to maintain the control valve means continuously actuated during the period between one output pulse and the next.

3. Control circuit means as claimed in claim 1 including first back-up means coupled between the input to the differentiating circuit and the output of the monostable circuit and which becomes effective when the wheel is being braked on a very slippery road surface, for which the usual output pulses produced by the control circuit means may be insufficient to free the wheel, to effect prolonged actuation of said control valve means.

4. Control circuit means as claimed in claim 1 further comprising first back-up means for effecting prolonged actuation of the control valve means and comprising, a deceleration detector for producing an output signal when the wheel deceleration exceeds said predetermined reference deceleration value, and a timing element responsive to said output signal to commence a timing sequence at the end of which it causes the control valve means to be held actuated independently of the output pulses produced by the pulse generating means until the wheel reaches the speed it would have been doing if it had continued to decelerate at the reference value.

5. Control circuit means as claimed in claim 1 including second back-up means responsive to the speed signal and arranged to measure the difference by which the wheel deceleration is in excess of the reference deceleration and including means for varying the width of the output pulses produced by the pulse generating means as a function of said difference.

6. Control circuit means as claimed in claim 5 wherein said second back-up means forms a part of said monostable circuit.

7. Control circuit means as claimed in claim 1 further comprising back-up means responsive to the speed signal for effecting prolonged actuation of the control valve means, and wherein the back-up means is adapted to be initially responsive when the reference deceleration is exceeded, and to be thereafter responsive to terminate its action in accordance with a lesser reference deceleration value to which it is subjected when the control valve means is actuated.

8. A vehicle anti-lock brake system comprising, means for producing an electric signal with a frequency that is proportional to the wheel speed, means for converting the frequency of said signal to a proportional DC speed voltage, a monostable circuit, a differentiating circuit coupled between the output of the converting means and the input of the monostable circuit, the component values of the differentiating circuit being chosen so as to define a given reference deceleration value whereby the differentiating circuit supplies a trigger signal to said monostable circuit when the speed voltage exceeds said reference value, control valve means for adjusting the brake pressure and coupled to the output of the monostable circuit, a feedback circuit coupling the output of the monostable circuit to the differentiating circuit, the monostable circuit, when triggered, producing an output pulse that actuates the control valve means and is fed back via the feedback circuit to reset the differentiating circuit so that the differentiating circuit is primed to produce another trigger signal if the existing speed voltage exceeds said reference value whereby the monostable circuit generates a series of output pulses at a rate which varies as a function of the difference between the existing wheel deceleration value and said reference deceleration value.

9. A brake system as claimed in claim 8 wherein the feedback circuit includes a diode and the monostable circuit includes an RC timing circuit which fixes the width of the monostable output pulses.

10. A brake system as claimed in claim 8 wherein said electric signal producing means includes a transistor with a diode connected between its collector and base electrodes and poled so as to maintain a fixed bias voltage at the base electrode.

11. A brake system as claimed in claim 8 further comprising a deceleration detector responsive to the speed voltage to produce an output signal when the speed voltage achieves a value that indicates that the wheel deceleration exceeds said reference deceleration value, and timing means responsive to said detector output signal to begin a timing operation at the end of which it supplies an actuating signal to the control valve means to actuate same independently of the output pulses supplied by the monostable circuit.

12. A brake system as claimed in claim 8 further comprising a back-up circuit with its input connected to receive the speed voltage and its output coupled to the monostable circuit, said back-up circuit including means for measuring the degree to which the wheel deceleration exceeds said reference deceleration value to produce a signal that varies in accordance therewith, said variable signal being applied to the monostable circuit to vary the width of the output pulses produced thereby as a function of said signal.

* * * * *